United States Patent [19]

Argentero et al.

[11] Patent Number: 5,358,555
[45] Date of Patent: Oct. 25, 1994

[54] INK FOR AN INK JET PRINTER

[75] Inventors: Massimo Argentero, Montanaro; Anna Maria Soudaz, Ivrea, both of Italy

[73] Assignee: Ing. C. Olivetti & C. S.p.A., Ivrea, Italy

[21] Appl. No.: 40,252

[22] Filed: Mar. 30, 1993

[30] Foreign Application Priority Data

Mar. 31, 1992 [IT] Italy .................. TO 92A000289

[51] Int. Cl.$^5$ .............................................. C09D 11/02
[52] U.S. Cl. .............................. 106/20 R; 106/20 D; 106/27 R; 106/28 R
[58] Field of Search .............. 106/20 R, 20 D, 27 R, 106/28 R

[56] References Cited

U.S. PATENT DOCUMENTS

| 2,357,927 | 9/1944 | Berg | 106/28 R |
| 3,615,750 | 10/1971 | Blair | 106/27 R |
| 3,946,138 | 3/1976 | Jones | 106/27 R |
| 4,386,961 | 6/1983 | Lin | 106/27 R |
| 4,665,107 | 5/1987 | Micale | 523/105 |
| 4,692,188 | 9/1987 | Ober et al. | 106/23 R |
| 4,981,517 | 1/1991 | De Santo, Jr. et al. | 106/28 R |
| 5,047,084 | 9/1991 | Miller et al. | 106/27 R |
| 5,158,606 | 10/1992 | Carlick et al. | 106/20 R |
| 5,226,957 | 7/1993 | Wickramanayake et al. | 106/24 R |

FOREIGN PATENT DOCUMENTS 0249685 12/1987 European Pat. Off. .
4211262 11/1992 Fed. Rep. of Germany .

Primary Examiner—Helene Klemanski
Attorney, Agent, or Firm—Banner, Birch, McKie & Beckett

[57] ABSTRACT

Ink for an ink jet printer comprises a microdisperse three-phase system having two liquid phases and one solid phase, the pigment. The ink exhibits a high indelibility and a low tendency towards the formation of microprecipitates.

5 Claims, No Drawings

INK FOR AN INK JET PRINTER

BACKGROUND OF THE INVENTION

The invention relates to inks which are suitable for ink jet printers.

A continuous-jet ink jet printing device is described in U.S. Pat. No. 3,596,275 while a device of the "on demand" type is describe in Italian Patent No. 1 182 478 in the name of the applicant. A known variant of the "on demand" type is the so-called "bubble" or "thermal ink jet" type, which makes use of heat as a source of energy to generate a bubble of vapour which creates a brief high pressure pulse for the expulsion of a drop of ink. The latter type of printing device is described in U.S. Pat. No. 4,723,129, in which the drops of ink are expelled as a result of a strong pressure pulse created by the instantaneous formation of a bubble of vapour following the heating of a resistor placed in the ink duct upstream of the nozzle.

The inks which are employed in particular in bubble and thermal ink jet printers, must comply with specific requirements, such as the following:

- the ink must produce images of high quality, in terms of definition and contrast, on plain paper;
- the ink must have good fixing characteristics on the paper, drying rapidly and proving itself to be difficult to remove by scrubbing;
- the ink must produce script with excellent storage characteristics, i.e. must give optimum performance in terms of "waterfastness" and of "lightfastness"; "waterfastness" is defined as the capacity of the script to resist the action of water, while "lightfastness" is defined as the capacity of the script not to lose its optical density, and not to change colour when it is exposed to the action of light;
- the ink must be entirely compatible with the materials of the writing head;
- the ink should not cause, even after prolonged periods of inactivity of the writing head, the nozzles to become clogged;
- the ink must be thermally stable; in particular, when it is used in a bubble or thermal head, it should not give rise to any insoluble combustion residues on the resistors;
- the ink must be stable over time, without exhibiting traces of sedimentation, nor of biological growth;
- the ink must be ecologically safe, nontoxic and nonflammable.

Among the above listed requirements, "waterfastness" and "lightfastness" of the script assume special importance where the indelibility of the document is required for legal use.

Inks which make use of dyes which are soluble in water, or in water-solvent mixtures, do not comply, in the present state of the art, in an entirely satisfactory manner with the requirements of waterfastness, lightfastness and of indelibility in general.

In order to solve this problem, various types of inks have been proposed, which provide, as an alternative to dyes in solution, the use of pigments.

Attention is drawn, by way of example, to Italian Patent No. 1 195 146 in the name of the applicant, as well as European Patent Applications Nos. 0 425 439 and 0 376 284. The Italian patent describes an ink in which the pigment is finely ground with dimensions not exceeding 1000 Å and is contained in quantities of between 0.1% and 2.5% by weight of the ink.

The other two European patent applications relate to inks in which the dispersion of the pigment is obtained by means of carboxylic resins.

The instability of the suspension represents one of the more serious problems found in the formulation of inks which make use of pigments.

It has been desired to solve the problem of the instability of the inks which make use of suspensions of pigments providing, an ink in which the tendency towards the formation of microprecipitates is minimized.

It has also been desired to provide an ink which produces printed matter with excellent characteristics of waterfastness, lightfastness and, more generally, of indelibility.

SUMMARY OF THE INVENTION

The present invention provides an ink which comprises a microdisperse three-phase system having two liquid phases and one solid phase. Inks according to the invention have optimum characteristics of waterfastness and lightfastness.

According to a first aspect of the invention there is provided a pigmented ink for ink jet printers comprising microdisperse three-phase suspension of a continuous liquid phase, a discontinuous liquid phase and a solid phase, preferably a pigment.

According to a second aspect of the invention there is provided ink for ink jet printers comprising a hydrophobic phase, a hydrophilic phase, a surfactant, a biocide, and an antioxidant.

This and other characteristics of the invention will emerge more clearly from the following embodiment, which is given on an illustrative but nonlimiting basis, with reference to the cited examples.

A pigmented ink consists of a microdisperse three-phase system having two liquid phases and one solid phase.

The solid phase is composed of an organic or inorganic pigment dispersed in one of the liquid phases. The two liquid phases form a microemulsion in which it possible to distinguish a continuous or external phase and a discontinuous or internal phase.

The discontinuous phase, whether this be a hydrophobic or hydrophilic phase, represents 2-30% of the microemulsion, and preferably 3-10%.

The hydrophobic phase is composed of natural, paraffin. naphthenic, synthetic or siloxane oils, polyglycols and polyheteroglycols which are not miscible with water or mixtures of the above cited compounds.

The hydrophilic phase is composed of water, or of mixtures of water and water-soluble organic solvents, such as glycols, thioglycols, glycol ethers, polyvinylpyrrolidone, N-methylpyrrolidone, etc.

The viscosity of the aqueous phase may be regulated by using appropriate additives, such as glycols, heteroglycols, carboxymethyl, cellulose or cyclodextrin.

A balancing in the viscosity of the two phases proves to be the preferred condition for obtaining good results in terms of stability of the ink, which must have a viscosity within the range of 1 and 10 mPa×sec.

The pigments used in the present invention may be either organic or inorganic. Among the former, the azo pigments and their derivatives, the polycyclic pigments such as the phthalocyanine pigments, the anthraquinone pigments and the quinacridone pigments may be mentioned. Among the inorganic pigments, carbon black may be mentioned. In any event, the pigments must be micronised to dimensions below one micron.

A preferred ink according to the invention further comprises a surfactant compound which consists of at least two surfactants: an emulsifier which is distributed at the liquid-liquid interface and a coemulsifier which stabilises the system.

In order to stabilise the suspension within the discontinuous phase and to make the microdrop elastic, a third surfactant may possibly be used.

Among the emulsifiers, triethanolamine oleate and sodium dodecylsulphate may be mentioned.

Among the coemulsifiers, alkylphenol ethoxylates, amine, alcohol and fatty acid ethoxylates, esters and ethoxylated esters of sorbitol may be mentioned.

The third surfactant may be selected from those cited as coemulsifiers.

To complete the formulation of the ink, there may be added, in the hydrophilic phase, commercial bactericides such as PROXEL, a Trade Mark of I.C.I., a product based on 1,2-benzothiazolin-3-one, or PREVENTOL D6, a Trade Mark of "Bayer", a preparation containing glycol semiformales and isothiazolinones and in the hydrophobic phase antioxidants such as hydroxytoluene butylate.

EXAMPLES

| Ink 1 | |
|---|---|
| Hydrophobic phase | |
| 30% microdispersion of carbon black in oleic acid | 19.0 grams |
| Sorbitan monostearate | 0.8 grams |
| Hydrophilic phase | |
| Triethanolamine | 3.0 grams |
| Sorbitan (20) OE monostearate | 4.0 grams |
| Water | 73.2 grams |
| Ink 2 | |
| Hydrophobic phase | |
| 30% microdispersion of carbon black in oleic acid | 19.0 grams |
| Sorbitan monooleate | 0.8 grams |
| Hydrophilic phase | |
| Triethanolamine | 3.0 grams |
| Sorbitan (20) OE monooleate | 4.0 grams |
| Water | 73.2 grams |

PREPARATION

The hydrophobic phase and the hydrophilic phase are mixed, separately, by mechanical agitation.

The hydrophilic phase is then poured, slowly, into the hydrophobic phase, maintaining the latter in strong mechanical agitation (5000 revs/min.).

The emulsion thus obtained is diluted with water.

The emulsion/water ratio, by weight, is preferably of between 1:3 and 1:10.

The emulsion is then subjected to sonication, which is continued for 30 minutes at a power of 30 watts, using a Sonic Material Vibra Cell apparatus (Danbury, Conn.). During the process, the emulsion is maintained at ambient temperature.

It is understood that the ink according to the following invention may be modified and improved without thereby departing from the scope of the present invention.

We claim:

1. A pigmented ink for ink jet printers comprising a microdisperse three-phase suspension composed of a continuous liquid phase, a discontinuous liquid phase, and a solid phase dispersed in the discontinuous phase, said continuous liquid phase being composed of water or of mixtures of water and water-soluble organic solvents selected from the group consisting of glycols, thioglycols, glycol ethers, polyvinylpyrrolidone and N-methylpyrrolidone, said discontinuous liquid phase being composed of natural oils, paraffin oils, naphthenic oils, synthetic or siloxane oils, said continuous and discontinuous liquid phases being mixed as an emulsion with emulsifiers selected from the group consisting of triethanolamine oleate and sodium dodecylsulphate and with coemulsifiers selected from the group consisting of alkyl phenol ethoxylates, amines, alcohol and fatty acid ethoxylates, esters and ethoxylates esters of sorbitol, wherein said emulsion contains a quantity of water in a ratio of water/emulsion of between 3:1 and 10:1 by weight and said discontinuous phase is present in an amount of from 2% to 30% by weight of the ink.

2. A pigmented ink according to claim 1, wherein said discontinuous phase is present in an amount of from 3% to 10% by weight of the ink.

3. A pigmented ink according to claim 1, wherein said ink has a viscosity of from 1 to 10 mPa·sec.

4. A pigmented ink according to claim 1, wherein the water contained in said ink is at least of 75% by weight of the ink.

5. A pigmented ink according to claim 2 or 3, further including a bactericide compound.

* * * * *